UNITED STATES PATENT OFFICE.

JOSEF LUDWIG WINTER, OF HAMBURG, GERMANY.

MATRIX.

SPECIFICATION forming part of Letters Patent No. 691,925, dated January 28, 1902.

Application filed December 21, 1899. Serial No. 741,184. (No model.)

*To all whom it may concern:*

Be it known that I, JOSEF LUDWIG WINTER, chief engineer, a subject of the Emperor of Germany, residing at 25 Kleine Drehbahn, Hamburg, in the Free State of Hamburg, Germany, have invented certain new and useful Improvements in Matrices, (for which I have applied for a patent in Germany, dated October 7, 1899; in France, dated October 11, 1899; in England, dated October 12, 1899, and in Austria, dated October 23, 1899,) of which the following is a specification.

The object of this invention is to provide a matrix for stereotype-printing to be employed in a completely-dry state and prepared exclusively of blotting-paper connected with each other by potato-starch. This matrix offers many advantages over the ordinary matrices consisting in most cases of silk paper and writing-paper and to be used only in a wet condition.

The new matrix is produced by applying a paste as ligament and intermediate layer for the fibrous material employed for the preparation of the matrix-pasteboard in form of blotting-paper, which is free of impurities and capable of absorbing. This paste imparts a permanent elasticity to the whole product and is suitably composed of forty per cent. starch, thirty-five per cent. potato-meal or pulverized or ground potato, and ten per cent. dextrine, to which ten per cent. of glycerin is added. Five per cent. of gelatin dissolved in cold water is preferably added and the whole diluted with sixty per cent. of water before use. A matrix produced with this paste has the following advantages: No previous work is required before stamping. During the stamping process performed by calendering, with the help of a felt, a sharp deep transparent but not penetrating impression is produced. As the stamping is rapidly effected by applying a felt, the types are not strained, as has been hitherto the case. After stamping the matrix is at once capable of casting. Bubbles are completely excluded, contrary to the wet process, in which the matrices are dried by steam or fire. The casting is clean and clear, without any tearing out of the matrix-paper. After the casting it remains unchanged, so that as many castings as desired may be made respectively. The matrix may be kept for years to serve its purpose.

I claim—

A matrix for stereotype-printing consisting of a plurality of sheets of absorbent blotting-paper united by a paste composed of starch, potato-meal, dextrine, glycerin, gelatin and water in substantially the proportions specified.

In witness whereof I have hereunto set my hand in presence of two witnesses.

JOSEF LUDWIG WINTER.

Witnesses:
E. H. L. MUMMENHOFF,
OTTO W. HELLMRICH.